(12) United States Patent
Gastineau

(10) Patent No.: US 10,181,778 B2
(45) Date of Patent: Jan. 15, 2019

(54) ACTIVE VIBRATORY CONTROL DEVICE

(71) Applicant: HUTCHINSON, Paris (FR)

(72) Inventor: Jean-Luc Gastineau, Douy (FR)

(73) Assignee: HUTCHINSON, Paris (FR)

( * ) Notice: Subject to any disclaimer, the term of this patent is extended or adjusted under 35 U.S.C. 154(b) by 223 days.

(21) Appl. No.: 15/219,567

(22) Filed: Jul. 26, 2016

(65) Prior Publication Data
US 2017/0033675 A1 Feb. 2, 2017

(30) Foreign Application Priority Data

Jul. 27, 2015 (FR) ...................... 15 57129

(51) Int. Cl.
| H02K 33/00 | (2006.01) |
| H02K 33/18 | (2006.01) |
| F16F 7/10 | (2006.01) |
| H02K 3/50 | (2006.01) |

(52) U.S. Cl.
CPC ............ *H02K 33/18* (2013.01); *F16F 7/1011* (2013.01); *H02K 3/50* (2013.01)

(58) Field of Classification Search
CPC ................................ H02K 3/50; H02K 33/18
USPC ................................................ 310/12.16, 25
See application file for complete search history.

(56) References Cited

U.S. PATENT DOCUMENTS

| 4,285,054 A | 8/1981 | McNeel | |
| 2010/0073890 A1 | 3/2010 | Miller | |
| 2011/0062800 A1* | 3/2011 | Tseng | ........................ G02B 7/08 310/12.16 |
| 2011/0249352 A1* | 10/2011 | Ku | .......................... F16F 1/027 359/824 |

FOREIGN PATENT DOCUMENTS

| EP | 2458243 A1 | 5/2012 |
| FR | 2765647 A1 | 7/1999 |

OTHER PUBLICATIONS

Machine Translation for FR 2 765 647 May 1, 2018.*
French Search Report Application No. FR 15 57129 reported on Jun. 13, 2016.

* cited by examiner

*Primary Examiner* — Hanh Nguyen
(74) *Attorney, Agent, or Firm* — Miller, Matthias & Hull LLP

(57) ABSTRACT

Active vibratory control device comprising an armature, a movable element comprising a coil and mounted so as to be able to slide with respect the armature, a spring connecting the armature to the movable element. The armature comprises an electrical supply circuit and the spring comprises a conductive part that connects the electrical supply circuit to the coil.

6 Claims, 3 Drawing Sheets

ACTIVE VIBRATORY CONTROL DEVICE

CROSS-REFERENCE TO RELATED APPLICATION

This application claims priority under the Paris Convention to French Patent Application No. 15 57129 filed on Jul. 27, 2015.

FIELD OF THE DISCLOSURE

The present invention relates to active vibratory control devices, in particular for vehicles.

BACKGROUND OF THE DISCLOSURE

More particularly, the invention relates to an active vibratory control device, comprising:
- an armature comprising at least one magnetically permeable part,
- a movable element comprising a coil extending around a movement axis and associated with a magnetically permeable carcass mounted so as to slide with respect to the armature along the movement axis,
- at least one spring connecting the armature to the movable element, said spring urging the movable element towards an idle position,
- the coil and the carcass being configured so that, when the coil has a variable current passing through it, it generates a magnetic field suitable for moving the movable element along the movement axis, thus generating vibrations.

An example of a device of this type is described for example in the document EP 1521352 A1.

Devices of this type are particularly advantageous since advantage is taken of the mass of the coil and of the carcass for generating vibrations, since the movable element needs to be relatively heavy for this purpose. In particular, the total mass of the active vibratory control device is less than when the coil and carcass are fixed and the armature movable.

These known active vibratory control devices do however have the drawback that the electrical supply cable to the coil is able to move with the coil along the movement axis. In order to guarantee the service life of the system and therefore to ensure the fatigue strength of the cable and of its connections, the latter is generally disposed in the form of a loop. In order to minimise stresses in the cable when the coil is in movement, this loop must be produced from a flexible lightweight cable but in particular must be sufficiently long and with a large radius of curvature. The device is in fact bulky, which makes it difficult to install the device on the vehicle and prevents integration of the device in a fixed housing.

The document FR 1557129 also describes an anti vibratory device of the aforementioned type, in which the armature comprises an electrical supply circuit. This antivibration device is however complex.

SUMMARY OF THE DISCLOSURE

The aim of the present invention is in particular to overcome these drawbacks.

To this end, according to the invention, an active vibratory control device of the type in question is characterised in that the spring comprises an elastic body made from electrically insulating material and at least one conductive circuit attached to the elastic body, connecting said electrical supply circuit to the coil.

By virtue of these provisions, the use of a flexible cable for supplying the coil is avoided, and it is thus possible to reduce the overall size of the active vibratory control device.

It will be noted that vibrations generated by the vibration generator may in particular be designed:
- so as to attenuate the vibrations coming from a vibrating member, as taught by example in the document FR 2860564, or, in another example, by acting so as to minimise the vibrations in the passenger compartment of the vehicle due to the engine,
- and/or so as to create additional sounds inside the passenger compartment and/or outside, for example in order to artificially create a sound of an engine other than that of the vehicle, as taught for example by the document EP 0469023 or the document WO 2006/097188.

In various embodiments of the vibratory control device according to the invention, it is optionally possible also to have recourse to one or other or all of the following provisions:
- said attached conductive circuit is a printed circuit;
- said electrically insulating material is a composite material comprising fibres embedded in a resin;
- the armature is surrounded by the carcass, the spring has a substantially annular shape having an internal periphery secured to the armature and an external periphery secured to the carcass, and said conductive circuit extends between the first end adjacent to the internal periphery and connected to the electrical supply circuit, and a second end adjacent to the external periphery and connected to the coil;
- the spring comprises two independent conductive circuits connecting the electrical supply circuit to the coil;
- the spring is substantially flat.

BRIEF DESCRIPTION OF THE DRAWINGS

Other features and advantages of the invention will emerge during the following description of one of its embodiments, given by way of non-limitative example with regard to the accompanying drawings.

In the drawings.

DETAILED DESCRIPTION OF THE DISCLOSURE

In the various figures, the same reference numbers designate identical or similar elements.

Figure 1:
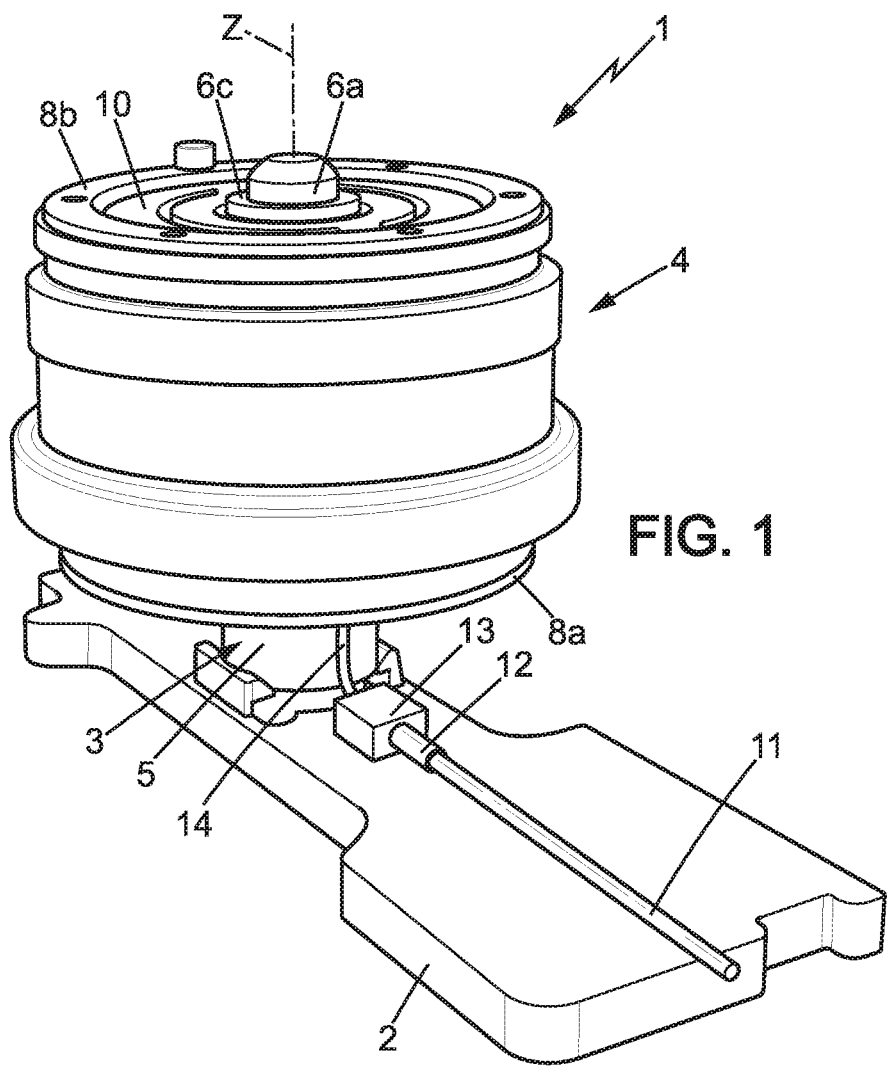
FIG. 1 is a schematic view in perspective illustrating an example of a vibratory control device according to one embodiment of the invention.

FIG. 1 depicts an active vibratory control device 1, intended to be mounted for example in a motor vehicle.

The active vibratory control device 1 can be mounted on a support 2, for example secured to the body of the vehicle, and may comprise:
- an armature 3 secured to the support 2,
- a movable element 4 mounted so as to slide with respect to the armature 3 along a movement axis Z, which may for example be substantially vertical.

Figure 2:
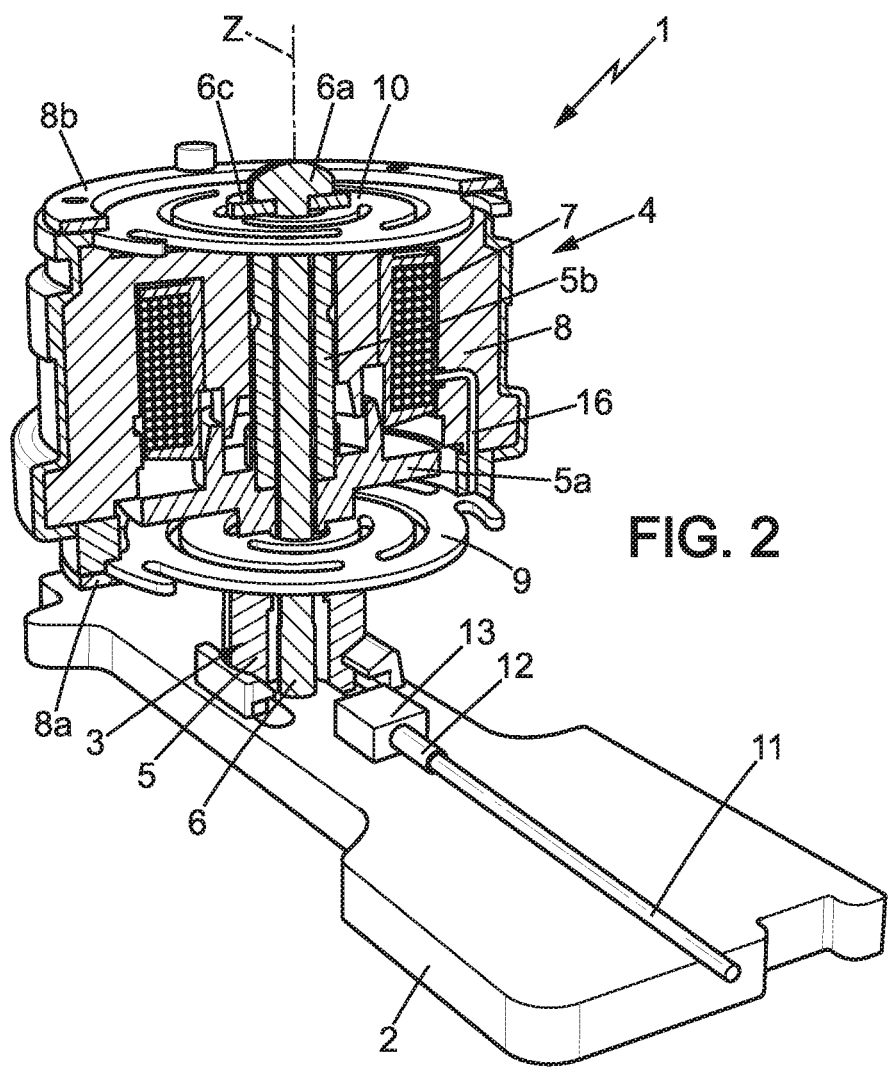
FIG. 2 is a view in perspective and in vertical section of the vibratory control device of FIG. 1.

As depicted in FIG. 2, the armature 3 may comprise a magnetically permeable part 5b disposed in the movable element, and the usefulness of which will be seen later.

More specifically, the armature 3 may comprise for example:
- a rigid central rod 6 extending along the axis Z and secured to the support 2,
- a first rigid strut 5 surrounding the central rod 6 and resting on the support 2,
- the aforementioned magnetically permeable part 5a surrounding the central rod 6 above the strut 5,
- a second rigid strut 5b surrounding the central rod 6 and resting on the magnetically permeable part 5a, this second strut 5b being held on the central rod by a broadened head 6a formed at the free end of the head 6.

The movable element 4 comprises an electric coil 7 extending around the movement axis Z and mounted in a magnetically permeable carcass 8, mounted so as to slide on the second strut 5b along the movement axis Z. The coil 7 and the carcass surround the armature 3.

In addition, the movable element is connected to the armature 3 by at least one spring, for example first and second springs 9, 10 urging the movable element 4 towards an idle position. The springs 9, 10 may in particular be flat springs extending substantially radially with respect to the axis Z.

More specifically a first annular spring 9 can be disposed around the central rod 6 with its internal periphery mounted clamped between the first strut 5 and the magnetically permeable part 5a.

The external periphery of the first spring 9 may be secured to the carcass 8, for example by means of a ring 8a screwed under the carcass 8 so that the external periphery of the first spring 9 is clamped between the ring 8a and the carcass 8.

A second annular spring 10 may be disposed around the central rod 6 with its internal periphery mounted clamped between the second strut 5b and the broadened head 6a of the central rod, with optionally the interposing of the washer 6b between the broadened head 6a and the second spring 10.

The external periphery of the second spring 10 may be secured to the carcass 8, for example by means of a ring 8b screwed onto the carcass 8 so that the external periphery of the second spring 10 is gripped between the ring 8b and the carcass 8.

The coil 7, the carcass 8 and the magnetically permeable part 5a of the armature are configured so that, when the coil has a variable current passing through it, it generates a magnetic field suitable for moving the movable element 4 along the movement axis Z, thus generating vibrations.

Figure 3:
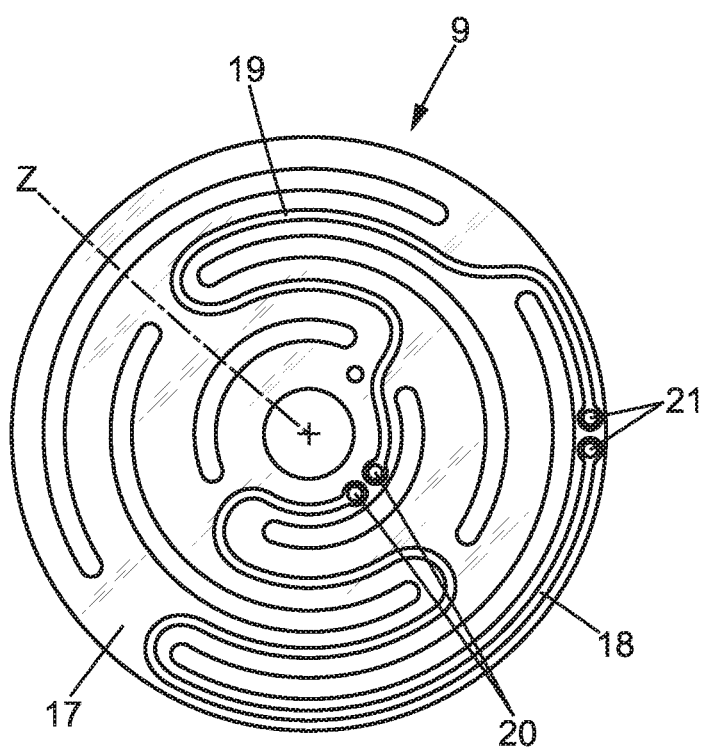
FIG. 3 is a plan view of one of the springs of the device of FIG. 2.

The coil 7 is supplied electrically by the vehicle, in a manner known per se, for example by a cable 11 having a connector 12 connected to a complementary connector 13 fixed to the support 2 (FIGS. 2 and 3). The connector 13 is connected to an electrical supply circuit 14 secured to the armature 3. This electrical supply circuit 14 may simply consist of a cable or electrically conductive tracks, or optionally comprise electronic components.

The electrical supply circuit 14 is connected to the coil 7 by at least one conductive part 18, 19 of at least one of the springs 9, 10, for example the first spring.

Optionally, the coil 7 may be connected to said at least one conductive part 18, 19 by conductive wires 16.

Optionally, said at least one conductive part 18, 19 may be connected to the electrical supply circuit 14 in the vicinity of the internal periphery of the spring 9, and the coil 7 may be connected to said at least conductive part 18, 19 in the vicinity of the external periphery of the spring 9.

As shown in FIG. 3, the spring 9 may comprise an elastic body 17 made from electrically insulating material and at least one conductive circuit 18, 19 attached to the elastic body 17, for example in the form of a printed circuit. Said electrically insulating material may be a composite material comprising fibres embedded in a resin (glass, carbon, basalt or other fibres).

Preferably, the spring 9 comprises two separate conductive circuits 18, 19 isolated from each other.

Each conductive circuit 18, 19 may comprise a conductive metal or alloy, or a conductive ink. It may be deposited on the surface of the elastic body 17 or on an intermediate layer.

Each conductive circuit 18, 19 can extend between two ends forming contacts, a radially inner contact 20 suitable for being connected to the supply circuit 14 by soldering or simple contact, and a radially outer contact 21 suitable for being connected to the coil 7 by soldering or simple contact.

The two conductive circuits 18, 19 may be on the same face of the spring 9.

Optionally, the contacts 20, 21 or one of them could be replaced by a connector.

Optionally, one of the electronic components could be soldered to the conductive circuits 18, 19.

The invention claimed is:

1. An active vibratory control device, comprising:
   an armature comprising at least one magnetically permeable part,
   a movable element comprising a coil extending around a movement axis and associated with a magnetically permeable carcass mounted so as to slide with respect to the armature along the movement axis,
   at least one spring connecting the armature to the movable element, said spring urging the movable element towards an idle position,
   the coil and the carcass being configured so that, when the coil has a variable current passing through it, it generates a magnetic field suitable for moving the movable element along the movement axis, thus generating vibrations, the armature comprising an electrical supply circuit,
   wherein the spring comprises an elastic body made from electrically insulating material and at least one conductive circuit attached to the elastic body, connecting said electrical supply circuit to the coil.

2. The active vibratory control device according to claim 1, in which said conductive circuit is a printed circuit.

3. The active vibratory control device according to claim 1, in which said electrically insulating material is a composite material comprising fibers embedded in a resin.

4. The active vibratory control device according to claim 1, in which the armature is surrounded by the carcass, the spring has an annular shape having an internal periphery secured to the armature and an external periphery secured to the carcass, and said conductive circuit extends between a first end adjacent to the internal periphery and connected to the electrical supply circuit, and a second end adjacent to the external periphery and connected to the coil.

5. The active vibratory control device according to claim 1, in which the spring comprises two independent conductive circuits, connecting the electrical supply circuit to the coil.

6. The active vibratory control device according to claim 1, in which the spring is flat.

* * * * *